G. B. BASSETT.
WATER METER.
APPLICATION FILED JULY 31, 1908.
1,073,387.
Patented Sept. 16, 1913.
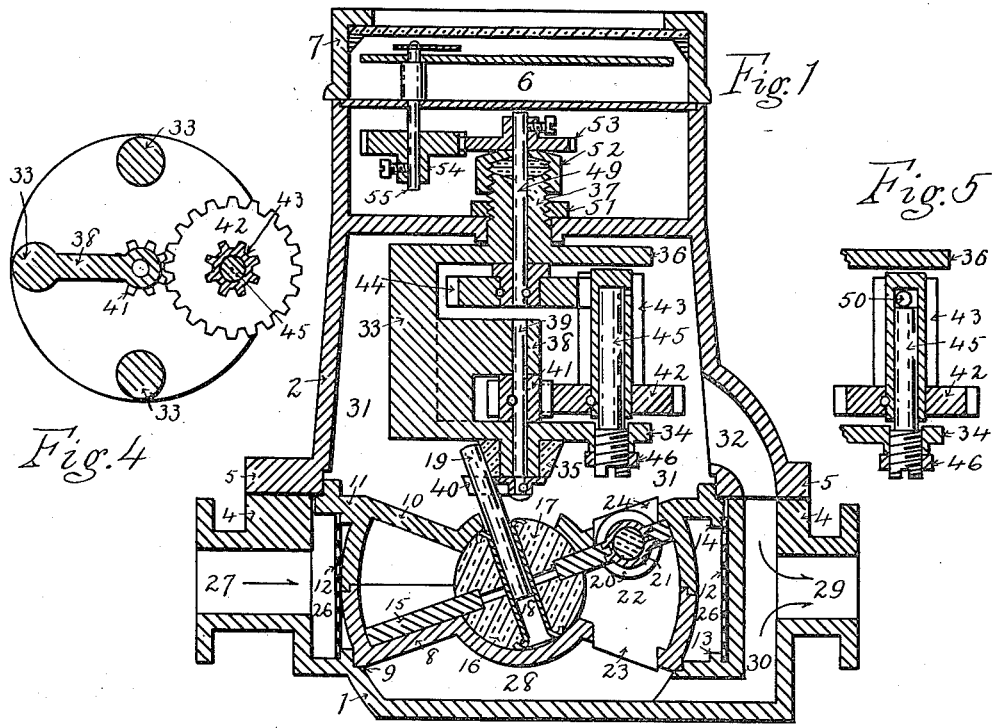
Fig. 1
Fig. 5
Fig. 4
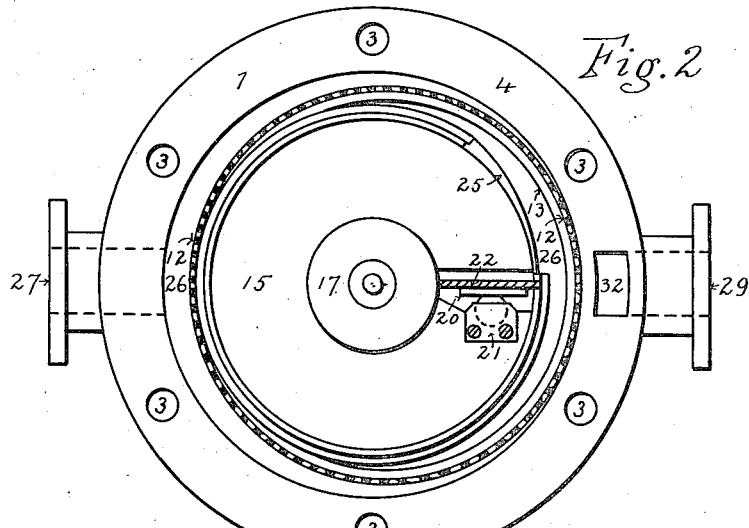
Fig. 2
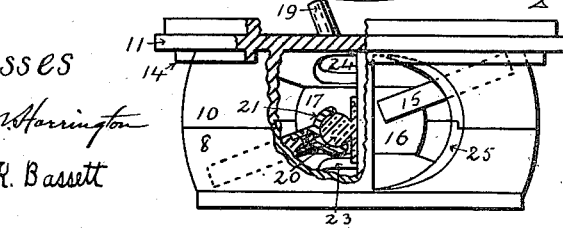
Fig. 3
Witnesses
Chas. M. Harrington
Charles R. Bassett
Inventor
George B. Bassett

UNITED STATES PATENT OFFICE.

GEORGE B. BASSETT, OF BUFFALO, NEW YORK.

WATER-METER.

1,073,387.

Specification of Letters Patent.

Patented Sept. 16, 1913.

Application filed July 31, 1908. Serial No. 446,360.

*To all whom it may concern:*

Be it known that I, GEORGE B. BASSETT, a citizen of the United States, residing at Buffalo, in the county of Erie and State of New York, have invented a new and useful Water-Meter, of which the following is a specification.

My invention relates principally to improvements in disk water meters but my improvements in the intermediate gearing and gear frame are applicable to any water meter using intermediate gearing between the measuring device and the indicator.

The objects of my invention are principally to improve the construction of the outside casing, disk chamber, disk and disk bearings, gear frame, intermediate gear and gear bearings, strainer and other parts in the construction of water meters for the purpose of reducing the cost of manufacture, allowing the more ready assemblage, separation and adjustment of parts, increasing the efficiency and durability, and giving other advantageous results. I attain these objects by the mechanism illustrated in the accompanying drawings in which—

Figure 1 is a vertical longitudinal section of the entire meter. Fig. 2 is a top view of the bottom half of the outside case containing the bottom half of the measuring chamber in which the disk is shown in a horizontal position for purposes of illustration. Fig. 3 is a side view of the measuring chamber, showing the ports into and out of same and is cut away opposite the outlet ports to show the outlet ports in the cones and a section of the disk web and sliding block, the disk spindle being in a position 90 degrees from its position in Fig. 1, for purposes of illustration. Fig. 4 is a horizontal section of the gear frame and the intermediate gear pinion. Fig. 5 shows an improved bearing for the intermediate gear over that shown in Fig. 1.

Similar numerals refer to similar parts throughout the several views.

1 is the outside bottom case of the meter to which top outside case 2 is fastened by bolts or screws passing through holes 3 in their meeting flanges 4 and 5.

6 is an indicator mounted in a circular notch formed in top of top case 2 and which is inclosed by indicator case 7 which is secured to top case 2 by the usual lugs and screws not shown.

8 is the bottom half of the measuring or disk chamber which is mounted in circular seat 9 formed in the lower interior part of outside bottom case 1.

10 is the top half of the measuring or disk chamber which has circular projecting flange 11 whereby the two halves of the disk chamber are clamped together and also held in seat 9 by top outside case 2 and its meeting flange 5.

12 is a circular cylindrical strainer that is held eccentrically around the outside of the measuring chamber by the eccentric circular projection 13 in bottom of outside case 1 and a corresponding eccentric circular projection 14 on the under side of measuring chamber flange 11.

In the disk chamber is supported the nutating measuring disk, the web 15 of which is clamped between the two halves 16 and 17 of the central bearing ball which are securely held together by hollow tubular rivet 18 in which is removably mounted the disk controlling spindle 19 which is tightly pressed into the central hole in tubular rivet 18. Web 15 may be made of metal. Heretofore, the two halves of the disk ball have been held together between a shoulder on the upper part of the disk spindle and a nut or screw on the lower part of same. As the disk ball is usually made of hard rubber, which has a much greater coefficient of expansion and contraction than metal, due to differences of temperature, the nut or screw has a tendency to work loose, which is overcome by my tubular rivet fastening. After the parts of the disk are assembled and before the disk spindle is pressed into place, the disk may be revolved by placing it on a lathe mandrel and tested to see that it is true, or the ball and web may be machined after it is assembled by holding it in the same manner. The disk spindle being removable, may be replaced when worn without disturbing the relative positions of the other parts of the disk.

The rotative thrust of the disk is received by sliding block 20, which is fastened to the disk with a ball and socket joint 21. Sliding block 20, which may be made of a non-metallic substance such as hard rubber, has a flat bearing surface against partition plate 22 upon which it slides up and down in the arc of a circle as the disk nutates. Heretofore, sliding blocks have been fastened to the disk so as to oscillate about an axis either parallel with the disk web or at right angles to it. In neither of these does the sliding block maintain a flat contact with the partition plate at all points of its path, which defect is overcome by my improved sliding block with a ball and socket fastening, as it can accommodate itself to every position of the disk and still keep a flat bearing surface against the partition plate. Partition plate 22 extends into recesses formed in the inner surface of the conical walls of the disk chamber so as to provide an ample bearing surface for sliding block 20 when at the ends of its path.

There are two outlet ports, 23 formed in the conical wall of lower half 8, and 24 formed in the conical wall of upper half 10 of the disk chamber, adjacent to and on the same side of partition plate 22. On the other side of and adjacent to partition plate 22 is inlet port 25 formed in the spherical side wall of the disk chamber.

The submerged space between the outside walls of the disk chamber and the inside walls of the outside case is divided into three compartments. Inlet compartment 26 extends entirely around the spherical side walls of the disk chamber and contains cylindrical strainer 12. It also connects inlet spud 27 with inlet port 25. Outlet chamber 28 is located entirely below the measuring chamber and connects outlet port 23 with outlet spud 29 through outlet channel 30. Above the measuring chamber is located intermediate gear and outlet chamber 31, which contains the submerged intermediate gearing or reducing train and also connects outlet port 24 with outlet spud 29 through outlet channel 32.

Outlet port 23 will let any dirt pass out of the disk chamber that may settle in it, which otherwise might accumulate and block the disk, while outlet port 24 will let out any air that may be in the disk chamber and which might otherwise be entrapped in it and prevent the meter giving full measurement. The outlet ports are so placed as to also form the recesses which accommodate sliding block 20 at the ends of its path.

The submerged gear frame is made with pillars 33 formed integral with bottom plate 34, on the center of the under side of which is mounted the disk controlling roller 35, and top plate 36 on the center of the upper side of which is formed holding stud 37. Heretofore, the top and bottom plates and pillars of the gear frame have been formed and machined separately and when assembled the controlling roller bearing and the top supporting stud sometimes are out of line which defect is overcome by my improved one-piece gear frame in which the supporting stud 37 and the bearing for controlling roller 35 may both be machined at one chucking.

Formed integral with the gear frame is overhanging bearing arm 38 in which revolves the upper end of driving shaft 39, on the lower end of which is crank arm 40 which contacts with and receives motion from disk spindle 19. Securely mounted on driving shaft 39 is driving pinion 41 which meshes with and drives intermediate gear wheel 42 which is securely mounted on intermediate gear pinion 43, which meshes with and drives stuffing box gear wheel 44 and its shaft 49. Intermediate toothed pinion 43 and its toothed gear 42 are loosely mounted on adjustable gear post 45 on which it turns. The upper end of gear post 45 receives the weight of pinion 43 and its gear 42. The lower end of gear post 45 has a screw thread by which it is supported in bottom plate 34 and also by which its height may be adjusted to take up any wear that may occur on its upper end.

46 is a jam nut to hold gear post 45 securely in place and prevent its turning after it has been adjusted to the proper height.

When it is desirable to reduce the friction of intermediate gear pinion 43 and its gear 42, I place a ball 50, on top of gear post 45, as shown in Fig. 5, making a very sensitive and easy running ball bearing at this point.

Clamping nut 51 securely holds supporting stud 37 and its gear frame in a hole formed in the top of outside case 2. On top of supporting stud 37 is the packing or stuffing box 52 through which stuffing box shaft 49 passes. On the top end of stuffing box shaft 49 is securely mounted meter change gear wheel 53 which meshes with and drives indicator change gear wheel 54 which is securely mounted on indicator spindle 55.

In operation, the water enters at inlet spud 27, thence passes through cylindrical strainer 12 and inlet compartment 26; thence through inlet port 25 into the measuring chamber causing the measuring disk to nutate; thence out of the measuring chamber through outlet ports 23 and 24 into outlet compartments 28 and 31; thence through channels 30 and 32 out of the meter through outlet spud 29. The motion of the nutating disk is communicated to indicator 6 by the submerged intermediate gearing, stuffing box shaft 49, and change gears 53 and 54.

Having thus described my invention, what I claim and desire to secure by Letters Patent is—

1. In a disk water meter, the combination ate toothed pinion formed with a longitudinal central hole closed at the upper end making an inclosed supporting bearing on the top end of said gear post and ball on which it rotates in transmitting motion from said device to said indicator, substantially as and for the purpose described.

In witness whereof I have hereunto set my signature this 28th day of July, 1908.

GEORGE B. BASSETT.

Witnesses:
CLIFFORD W. HALL,
CHAS. M. HARRINGTON.